United States Patent Office 3,301,817
Patented Jan. 31, 1967

---

3,301,817
CARBONYL-CONTAINING ORGANOSILICON MATERIALS
Edward V. Wilkus, Albany, and Abe Berger, Schenectady, N.Y., assignors to General Electric Company, a corporation of New York
No Drawing. Filed Nov. 2, 1964, Ser. No. 408,367
11 Claims. (Cl. 260—46.5)

The present invention relates to carbonyl-containing organosilicon materials useful for making elastomers having improved resistance to swell in fluid hydrocarbons. More particularly, the present invention relates to a method of acylating an aryl nucleus with a silicon-containing carboxylic acid halide and to the resulting materials obtained therefrom.

The carbonyl-containing organiosilicon materials included by the present invention are selected from (A) organosilicon materials of the formula, (1) 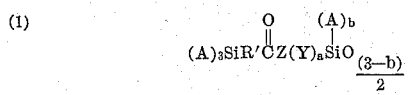

(B) polymers consisting essentially of chemically combined units of the formula, (2) 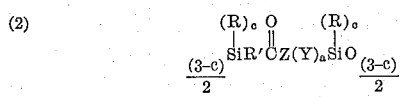

and (C) copolymers composed of 0.01 to 99.99 mole percent of chemically combined organosiloxy units of the formula, (3) 

and 99.99 to 0.01 mole percent of units of Formula 2, where R is selected from monovalent hydrocarbon radicals, halogenated monovalent hydrocarbon radicals, and cyanoalkyl radicals, R' is selected from divalent hydrocarbon radicals, and halogenated divalent hydrocarbon radicals, A is selected from hydrogen, R radicals, halogen radicals and alkoxy radicals, Z is selected from an arylene radical, a divalent aryl ether radical having free valences in the terminal positions, a divalent five-membered heterocyclic aromatic radical having a Group VI-A element as the hetero atom, and substituted derivatives thereof, Y is selected from

CR' and R'', where R'' is alkylene, a is a whole number equal to 0 or 1, b is an integer equal to 2 or 3, c is a whole number equal to 0 to 2, inclusive, and d is an integer equal to 1 to 3, inclusive.

Radicals included by R of the above formulae are aryl radicals, and halogenated aryl radicals such as phenyl, chlorophenyl, xylyl, tolyl, etc.; aralkyl radicals such as phenylethyl, benzyl, etc.; aliphatic radicals, haloaliphatic radicals, and cycloaliphatic radicals such as methyl, ethyl, propyl, butyl, vinyl, allyl, cyclohexyl, trifluoropropyl, tetrafluorobutyl, etc., cyanoalkyl such as cyanoethyl, cyanopropyl, cyanobutyl, etc. Radicals included by R' of the above formulae are arylene radicals, halogenated arylene radicals, alkylene radicals, and halogenated alkylene radicals, such as phenylene, tolylene, methylene, ethylene, trimethylene, tetramethylene, pentamethylene, decamethylene, chlorophenylene, etc. Radicals included by Z of the above formulae are for example, phenylene, chlorophenylene, ethoxyphenylene, phenyleneoxyphenylene, biphenylene, thiophene, furan, etc. Radicals included by A are all of the aforementioned R radicals, ethoxy, butoxy, chloro, bromo, etc. Radicals included by R'' are all of the aforementioned alkylene radicals included by R'. In Formulae 1, 2 and 3 where R, R', Z, and A respectively represent more than one radical, all of these radicals can be the same or a mixture of any two or more of the aforementioned radicals, separately included by R, R', Z and A.

The carbonyl-containing organosilicon materials of Formula 1, can be made by acylating an "aryl nucleus" which hereinafter will include aromatic compounds, heterocyclic compounds, as previously defined, as well as certain aryl-substituted organosilanes shown below by Formula 5. Aryl nuclei which can be employed are for example, benzene, naphthylene, diphenylether, furan, thiophene, etc. These aryl nuclei can be acylated with a silyl acid halide having the formula:

(4) 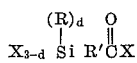

where the terms R, R' and d are the same as above, and X is a halogen radical such as chloro, bromo, etc. Certain of the aryl nuclei, for example, benzene, included within the scope of the invention cannot be readily diacylated with the silyl acid halide of Formula 4. In instances where the aryl nucleus cannot be directly diacylated in accordance with the practice of the invention, certain dicarbonyl analogues of the carbonyl-containing organosilicon material of the invention having units included by the above formulae can be made by an indirect procedure. A silane of the formula, (5) 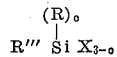

can be monoacylated with the silyl acid halide of Formula 4 where R, X and c are defined above, and R''' is selected from monovalent arylalkyl radicals such as benzyl, phenylethyl, etc., which is attached to silicon through the alkylene radical by carbon-silicon linkages. Oxidation of the resulting acylated product with a standard oxidizing agent, for example, manganese dioxide, can convert methylene, alpha to the aryl nucleus, to carbonyl. Alternatively, if desired, diacylation of certain of the aryl nuclei operable in the present invention which normally cannot be diacylated directly, can be effected by initially monoacylating the aryl nucleus with the silyl acid halide of Formula 4. The carbonyl radical is then reduced to methylene with a metal hydride such as lithium aluminum hydride in the presence of aluminum chloride. The resulting product can be acylated again, followed by oxidation of the previously reduced carbonyl radical as described above.

Carboxylic acid halides of Formula 4, and methods for making them are shown by Sommer et al., J.A.C.S. 73, 5130, (1951). Included by the carboxylic acid halide of Formula 4 are beta-trichlorosilylpropionyl chloride, gamma-methyldichlorosilylbutyryl chloride, gamma-phenylmethylchlorosilylbutyryl chloride, etc.

Methods for making some of the arylalkyl-substituted halosilanes included by Formula 5 are shown by Speier and Hook 2,823,218. For example, alkenyl-substituted aryl hydrocarbons such as styrene or allyl benzene can be added to silicon hydrides in the presence of platinum catalyst.

Acylation catalysts that can be utilized to effect reaction between the silyl acid halide of Formula 4, with an aryl nucleus in accordance with the practice of the invention, include for example, aluminum chloride, boron trichloride, zinc chloride, stannic chloride, polyphosphoric acid, etc.

The carbonyl-containing organosilicon polymers of

Formulae 2 and 3, can be made by hydrolyzing organosilicon materials of Formula 1, or cohydrolyzing such materials with organohalosilane of the formula.

(6) $\quad (R)_d SiX_{(4-a)}$ where R, $d$ and X are as defined above. Included by Formula 6 are methyltrichlorosilane, methylphenyldibromosilane, dimethyldichlorosilane, trimethylchlorosilane, methylvinyldichlorosilane, methylcyanoethyldichlorosilane, etc.

The carbonyl-containing organosilicon polymers of the present invention can be fluids, viscous gums, or resinous solids, depending upon the functionality of the respective chemically combined units. The polymers can be composed of from 2 to 3,000 chemically combined units, while preferably they are composed of from 2 to 500 chemically combined units. Preferably, the cabronyl-containing polymers of the present invention consist essentially of chemically combined units of the formula:

(7)
$$\left[ \begin{array}{c} (R)_2 \ O \ (R)_2 \\ \mid \ \| \ \mid \\ SiR'CZ(Y)_bSiO \end{array} \right]$$

where R, R', Z, Y and $b$ are as defined above. Copolymers of 5 to 95 mole percent of units of Formula 7 chemically combined with 95 to 5 mole percent of diorganosiloxy units of the formula, (8) $\quad R_2SiO$ are also included. The aforementioned polymers and copolymers can be silanol chain-stopped, or if desired, chain-stopped with $R_3SiO_{0.5}$ units.

The carbonyl-containing organosilicon polymers consisting essentially of chemically combined units of Formulae 7 and 8 can be compounded with conventional organopolysiloxane elastomer materials such as silica fillers, for example, fumed silica, heat-age additives, plasticizers, pigments, etc. A proportion of from 10 to 300 parts of filler, for example, a silica filler non-reinforcing fillers such as zinc oxide, diatomaceous earth, etc., can be employed. Cure of the organosilicon polymers consisting of chemically combined units of Formulae 7 and 8 can be effected with conventional room temperature vulcanizing curing agents, such as methyltriacetoxysilane, or curing agents such as organosilicates in combination with a metal soap, such as dibutyltindilaurate, zinc octoate, etc. as taught by Berridge Patent 2,845,541, assigned to the same assignee as the present invention. Peroxide curing catalysts also can be employed such as benzoyl peroxide, dicumyl peroxide, etc.

In the practice of the invention, the carbonyl-containing organosilicon polymers can be made by acylating an aryl nucleus with a silyl acid halide shown by Formula 4, in the presence of a Friedel-Crafts catalyst. The acylation product can then be hydrolyzed to produce a carbonyl-containing organosilicon polymer, or it can be cohydrolyzed with organohalosilanes included by Formula 6.

In many instances, the acylation of the aryl nucleus can be accomplished by standard Friedel-Crafts methods. Experience has shown, however, that a modified Friedel-Crafts procedure must be employed when utilizing a silylalkyl acid halide having less than four carbon atoms between the silicon atom and the carbonyl group. It has been found for example, that silylalkyl acid halide, for example, a silylpropionyl halide, decomposes when mixed with a Friedel-Crafts catalyst such as an aluminum halide in the absence of the aryl nucleus. In instances where a silyl acid halide such as propionyl halide is used, it is preferred to add the Friedel-Crafts catalyst in small increments to a mixture containing the aryl nucleus and the silyl acid halide. If desired, a suitable organic solvent can be utilized during the acylation of the aryl nucleus to facilitate the acylation reaction. Suitable organic solvents are organic solvents which are substantially inert to the reactants and stable to the conditions employed during the reaction. Suitable organic solvents include for example, methylene chloride, nitrobenzene, carbon disulfide, etc. Temperatures at which acylation of the aryl nucleus can be effected can vary widely. For example, a range of from −30° C. to 150° C. has been found to be operable, while a range of between 30° C. to 100° C. is preferred.

Hydrolysis of the acylated aryl nucleus can be achieved by standard procedures. A dilute aqueous hydrochloric acid solution and ice can be employed directly with the acylation reaction mixture. In instances where the acylated aryl nucleus is free of halogen attached to silicon, such as where the acylated aryl nucleus has organo radicals attached to silicon by carbon-silicon linkages, cleavage of such organo radicals must be effected. One procedure that can be used to sever organo radicals from silicon to provide for the formation of carbonyl-containing organosilicon polymer is sulphuric acid cleavage. Sulphuric acid cleavage can be effected by mixing the acylated aryl nucleus with concentrated sulphuric acid and then hydrolyzing the resulting mixture; the desired carbonyl-containing organosilicon polymer can be extracted from the resulting hydrolyzate by use of an organic solvent. Recovery and further purification can be achieved with standard procedures such as chromatography, etc.

In forming copolymers of the acylated aryl nucleus and organosiloxy units of Formula 3, cohydrolysis of the acylated aryl nucleus and organohalosilane of Formula 6 can be effected in accordance with conventional procedures. The procedure employed for the hydrolysis of the acylated aryl nucleus can be utilized for cohydrolyzing the acylated aryl nucleus and organohalosilane.

In order that those skilled in the art will be better able to practice the invention, the following examples are given by way of illustration and not by way of limitation. All parts are by weight.

Example 1

There were added 13.3 parts of anhydrous aluminum chloride to a mixture of 17.8 parts of beta-trimethylsilylethylbenzene, 17.8 parts of trimethylsilylbutyryl chloride and 103 parts of ethylene chloride. The beta-trimethylsilylethylbenzene which had a boiling point of about 93–94° C. (4 mm.) was made by adding trichlorosilane to styrene by means of a silicon hydride addition reaction with a platinum catalyst, followed by methylation with methylmagnesium bromide.

The mixture was brought to reflux at a temperature between 88° C. to 90° C. and refluxed for 10 hours. The mixture was poured onto ice to effect the decomposition of the aluminum chloride complex. The product was then heated on a steam bath for one hour. The organic phase was separated and washed several times with water and the product was then dried and filtered. The solvent was stripped from the product and the product was fractionated. There were obtained five parts of product having a boiling range between 154° C. to 158° C. at 0.8 mm. The product solidified on standing and had a melting point of 46° C. Based on its method of preparation and its infrared spectrum it was p-(trimethylsilylethyl)trimethylsilylbutyrylbenzene.

Example 2

There were added to 45 parts of concentrated sulphuric acid, 3 parts of the above p-(trimethylsilylethyl)trimethylsilylbutyrylbenzene. The mixture was agitated for 4 hours until the evolution of methane had ceased. The sulphuric acid solution was then divided into equal parts. The first part was added to ice, heated on a steam bath for one hour, and then extracted with methylene chloride. The organic phase was then washed and dried, and the solvent stripped. There were obtained 0.5 part of a viscous product. Its infrared spectrum was consistent with a silanol chain-stopped homopolymer of the formula,

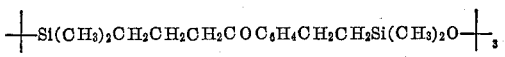

Example 3

There were added 3 parts of dimethyldichlorosilane to the product of reaction of 23 parts of concentrated sulphuric acid and 1.2 parts of p-(trimethylsilylethyl)trimethylsilylbutyrylbenzene cleaved in accordance with the procedure of Example 2. The resulting mixture was stirred for 25 minutes and then added to ice water. The mixture was then heated on a steam bath for 1 hour and extracted with methylene chloride. The organic phase was washed and dried, and then stripped. There were obtained 8 parts of a product. Its infrared spectrum was consistent with a copolymer composed of about 95 mole percent of chemically combined dimethylsiloxy units and about 5 mole percent of units of Example 2.

Example 4

A room temperature vulcanizing composition was prepared by mixing 50 parts of the homopolymer of Example 2 with 4½ parts of ethylpolysilicate and 4 parts of dibutyltindilaurate. The mixture was allowed to stand at room temperature for 3 days in an aluminum cup. A slab was then cut from the resulting film which formed. The slab was immersed in toluene at room temperature for 3 days. It swelled 93% of its original volume.

A similar film was made from a silanol-stopped dimethylpolysiloxane having an average length of about 1,000 chemically combined dimethylsiloxy units. A slab cut from the polydimethylsiloxane film which was cured in accordance with the same procedure used with the composition of the present invention was found to swell 345% of its original volume.

Based upon the above results, those skilled in the art would know that the carbonyl-containing organosilicon materials of the present invention provide for the production of polymers having improved resistance to swelling in hydrocarbons. As shown by the results of Example 4, a conventional polydimethylsiloxane polymer which was cured in accordance with the same procedure of the composition of the present invention and measured for resistance to swelling in toluene was found to swell almost 4 times the amount as the composition of the present invention. In addition to possessing a high resistance to swelling in hydrocarbon solvents, those skilled in the art also know that the carbonyl-containing polymers of the present invention can provide for elastomers having significantly improved tensile strength over organopolysiloxanes having the same molecular weight. As a result, the polymers of the present invention can be employed in a variety of useful applications requiring elastomers possessing improved resistance to oil swell and improved tensile strength.

While the foregoing examples have of necessity been limited to only a few of the very many variables within the scope of the present invention, it should be understood that the present invention covers a much broader class of carbonyl-containing organosilicon materials shown by Formula 1, as well as polymers of chemically combined units of Formula 2 and copolymers of units of Formulae 2 and 3. It should also be understood that the present invention is also directed to a method for making a variety of carbonyl-containing organosilicon materials by reacting a silyl acid halide of Formula 4 with an aryl nucleus included within the scope of the present invention, as well as the hydrolysis products of these acylated aryl nuclei.

What we claim as new and desire to secure by Letters Patent of the United States is:

1. Carbonyl-containing organosilicon materials selected from the class consisting of (1) organosilicon materials of the formula,

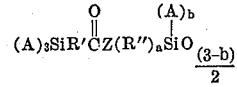

(2) polymers consisting essentially of chemically combined units of the formula,

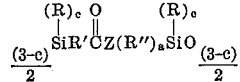

(3) copolymers of from 0.01 to 99.99 mole percent of organosiloxy units of the formula,

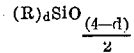

chemically combined with from 99.99 to 0.01 mole percent of (2), and (4) curable compositions comprising (a), a curing agent, and (b) a silanol chain-stopped polymer selected from
  (i) homopolymers consisting essentially of chemically combined units of (2) and,
  (ii) copolymers of from 5 to 95 mole percent of units of (2), chemically combined with from 95 to 5 mole percent of $R_2SiO$ units, where R is selected from the class consisting of monovalent hydrocarbon radicals, halogenated monovalent hydrocarbon radicals, and cyanoalkyl radicals, R' is selected from the class consisting of divalent hydrocarbon radicals and halogenated divalent hydrocarbon radicals, A is selected from the class consisting of hydrogen, R radicals, halogen radicals, and alkoxy radicals, Z is an arylene radical, R'' is an alkylene radical, a is a whole number equal to 0 or 1, b is an integer equal to 2 or 3, c is a whole number equal to 0 to 2, inclusive, and d is an integer equal to 1 to 3, inclusive.

2. Carbonyl-containing organosilicon polymers consisting essentially of chemically combined units of the formula,

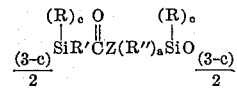

where R is selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Z is an arylene radical, R'' is an alkylene radical, a is a whole number equal to 0 or 1, and c is a whole number equal to 0 to 2, inclusive.

3. Carbonyl-containing organosilicon copolymers composed of from 0.01 to 99.99 mole percent of organosiloxy units of the formula,

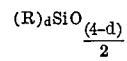

chemically combined with from 99.99 to 0.01 mole percent of units of the formula,

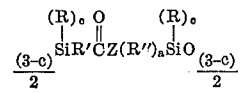

where R is selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Z is an arylene radical, R'' is an alkylene radical, a is a whole number equal to 0 or 1, c is a whole number equal to 0 to 2, inclusive, and d is an integer equal to 1 to 3, inclusive.

4. Carbonyl-containing organosilicon materials of the formula,

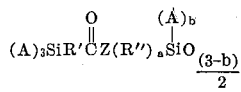

where A is selected from the class consisting of hydrogen, monovalent hydrocarbon radicals, halogenated monovalent hydrocarbon radicals, cyanoalkyl radicals, halogen radicals, and alkoxy radicals, R' is selected from divalent hydrocarbon radicals, and halogenated divalent hydrocarbon radicals, Z is an arylene radical, R'' is an alkylene radical, $a$ is a whole number equal to 0 or 1, and $b$ is an integer equal to 2 or 3.

5. Carbonyl-containing organosilicon polymers consisting essentially of chemically combined units of the formula,

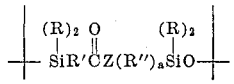

where R is selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Z is an arylene radical, R'' is an alkylene radical, and $a$ is a whole number equal to 0 or 1.

6. Carbonyl-containing organosilicon copolymers composed of from 5 to 95 mole percent of units of the formula,

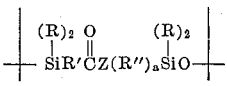

chemically combined with from 95 to 5 mole percent of $R_2SiO$ units, where R is selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Z is an arylene radical, R'' is an alkylene radical, and $a$ is a whole number equal to 0 or 1.

7. A composition comprising (1) a silanol chain-stopped polymer consisting essentially of chemically combined units of the formula,

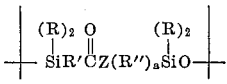

and (2) an effective amount of a curing agent, where R is selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Z is an arylene radical, R'' is an alkylene radical, and $a$ is an integer equal to 0 or 1.

8. A composition comprising (1) a silanol chain-stopped copolymer composed of from 5 to 95 mole percent of units of the formula,

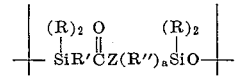

chemically combined with from 95 to 5 mole percent of $R_2SiO$ units, and (2) an effective amount of a curing agent, where R is selected from the class consisting of monovalent hydrocarbon radicals, halogenated monovalent hydrocarbon radicals, and cyanoalkyl radicals, R' is selected from the class consisting of divalent hydrocarbon radicals, and halogenated divalent hydrocarbon radicals, Z is an arylene radical, R'' is an alkylene radical, and $a$ is a whole number equal to 0 or 1.

9. A silanol-terminated copolymer consisting essentially of about 95 mole percent of

units chemically combined with about five mole percent of

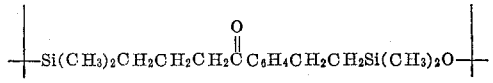

units.

10. A silanol chain-stopped homopolymer consisting essentially of from 2 to 3,000 chemically combined units of the formula,

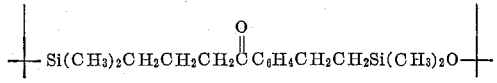

11. p - (Trimethylsilylethyl)trimethylsilyl - butyrylbenzene.

References Cited by the Examiner
UNITED STATES PATENTS

| | | | |
|---|---|---|---|
| 2,591,736 | 4/1952 | Sommer | 260—46.5 |
| 2,662,910 | 12/1953 | Sommer | 260—448.2 |
| 2,672,474 | 3/1954 | Sommer | 260—448.2 |
| 2,989,559 | 6/1961 | Marsden | 260—46.5 |
| 3,050,501 | 8/1962 | Sommer | 260—448.2 |

LEON J. BERCOVITZ, *Primary Examiner.*

M. I. MARQUIS, *Assistant Examiner.*